(12) United States Patent
Eerenberg et al.

(10) Patent No.: US 8,020,071 B2
(45) Date of Patent: Sep. 13, 2011

(54) DEVICE WITH MPE-FEC FRAME MEMORY

(75) Inventors: Onno Eerenberg, Eindhoven (NL); Arie Geert Cornelis Koppelaar, Eindhoven (NL); Armand Stuivenwold, Nijmegen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 607 days.

(21) Appl. No.: 12/097,768

(22) PCT Filed: Dec. 8, 2006

(86) PCT No.: PCT/IB2006/054683
§ 371 (c)(1),
(2), (4) Date: Jun. 17, 2008

(87) PCT Pub. No.: WO2007/072272
PCT Pub. Date: Jun. 28, 2007

(65) Prior Publication Data
US 2008/0263428 A1   Oct. 23, 2008

(30) Foreign Application Priority Data

Dec. 20, 2005   (EP) .................................... 05112493

(51) Int. Cl.
*H03M 13/00* (2006.01)
(52) U.S. Cl. .......................... 714/762; 370/242; 370/473
(58) Field of Classification Search .................. 714/762; 370/242, 473
See application file for complete search history.

(56) References Cited

U.S. PATENT DOCUMENTS

| | | | |
|---|---|---|---|
| 2006/0268726 A1* | 11/2006 | Alamaunu et al. | 370/242 |
| 2007/0002900 A1* | 1/2007 | Karkas et al. | 370/473 |
| 2007/0143810 A1* | 6/2007 | Yousef | 725/120 |
| 2008/0301477 A1* | 12/2008 | Gade et al. | 713/320 |

FOREIGN PATENT DOCUMENTS

| | | |
|---|---|---|
| GB | 2401759 A | 11/2004 |
| GB | 2406483 A | 3/2005 |
| GB | 2407946 A | 5/2005 |
| WO | 2004102964 A1 | 11/2004 |

OTHER PUBLICATIONS

Jani Vare, et al: Soft Handover in Terrestrial Broadcast Networks, Proceedings of the 2004 IEEE, International Conf. on Mobile Data Management, pp. 236-242.
Heidi Joki, et al: Analysis and Simulation of DVB-H Link Layer, TUCS Technical report, No. 695, Jun. 2005, pp. 1-22.
ETSI EN 302 304 V1.1.1: Digital Video Broadcasting (DVB) Transmission System for Handheld Terminals (DVB-H), Nov. 2004, pp. 1-14.

* cited by examiner

*Primary Examiner* — Sam Rizk

(57) ABSTRACT

In transmission systems using digital video broadcasting standards for handheld terminals data is transmitted in bursts. Due to the restricted computing time, buffering of one or more bursts is necessary. The invention provides a memory optimalization for consecutive burst support. Thereby, a cyclic or non-cyclic memory model for a memory unit (19) of the device (1) for receiving bursts is provided.

10 Claims, 3 Drawing Sheets

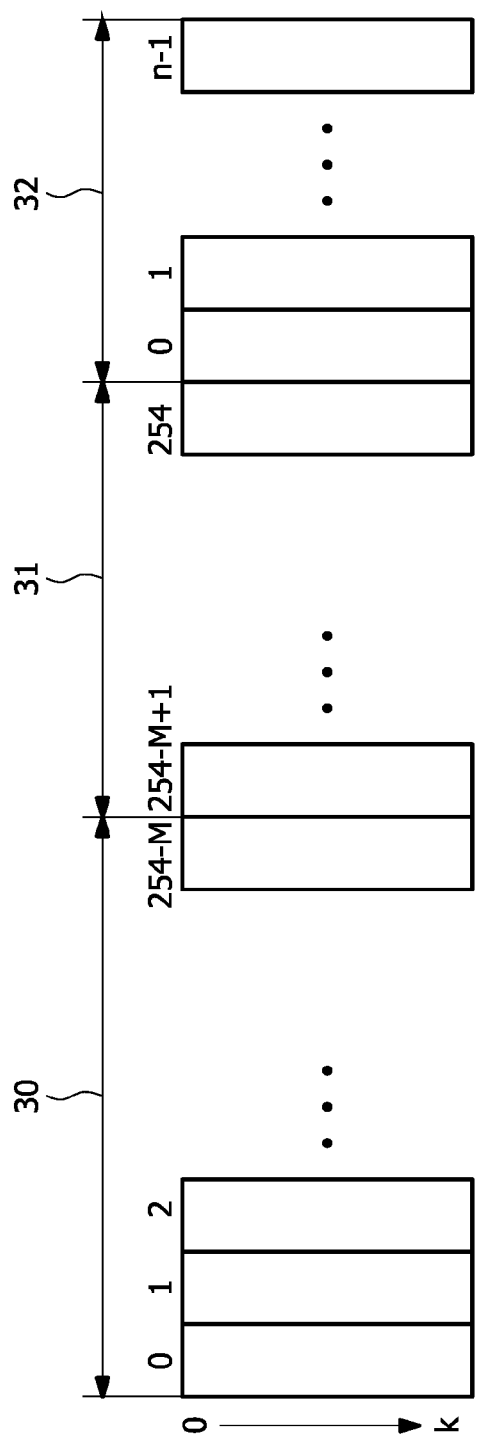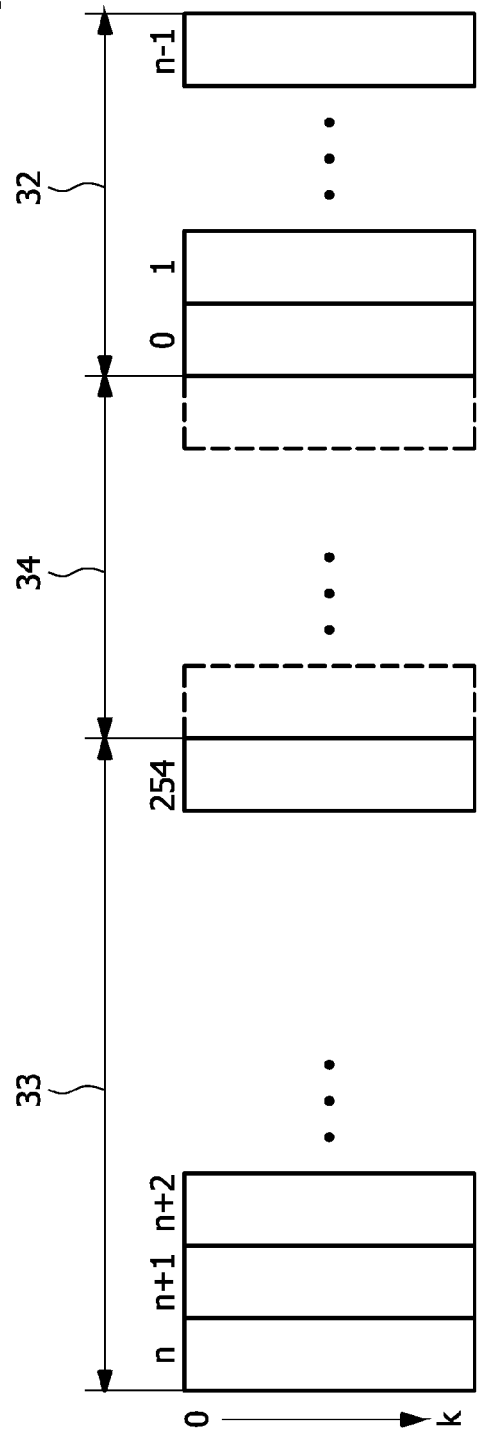

DEVICE WITH MPE-FEC FRAME MEMORY

The present invention relates to a device and method for receiving bursts in a communications network. More particularly, the present invention relates to a mobile device, especially a handheld terminal, to receive multimedia services over digital terrestrial broadcasting networks.

State of the art document ETSI EN 302 304 V1.1.1 (2004-11) with the title "Digital Video Broadcasting (DVB); Transmission System for Handheld Terminals (DVB-H)" of the European Broadcasting Union describes the transmission system using digital video broadcasting standards to provide an efficient way of carrying multimedia services over digital terrestrial broadcasting networks to handheld terminals (DVB-H). Thereby, a full DVB-H system is defined by combining elements in the physical and link layers as well as service information. The link layer for DVB-H makes use of time-slicing in order to reduce the average power consumption of the terminal and enabling smooth and seamless frequency handover, and of forward error correction for multiprotocol encapsulation data (MPE-FEC) for an improvement in the carrier to noise performance and Doppler performance in mobile channels, also improving tolerance to impulse interference.

The conceptual structure of a DVB-H receiver includes a time-slicing module and an MPE-FEC module. The time-slicing module aims to save receiver power consumption while enabling to perform smooth and seamless frequency handover. The MPE-FEC module offers over the physical layer transmission, a complementary forward error correction allowing the receiver to cope with particularly difficult receiving situations.

State of the art document GB 2 406 483 A describes a method of transmitting bursts in a terrestrial digital video broadcasting network being used to transmit internet protocol datagrams to receiving devices using multiprotocol encapsulation. Thereby, application data is transmitted in bursts different from bursts for forward error correction data. Further, in order to save power, a controller instructs the receiver to listen for forward error correction data and receives forward error correction data, but if no error is detected in the application data burst, then to listen for application data only and skip the forward error correction data burst.

The method known from GB 2 406 483 A has the disadvantage that reception of the forward error correction data is necessary most times, because the multiprotocol encapsulation data is hardly totally error free. Further, the multiprotocol encapsulation data has to be stored until the forward error correction data is received so that the memory consumption is increased.

It is an object of the invention to provide a device and a method for receiving bursts in a communications network with an improved receiving performance, especially with a reduced memory consumption.

The present invention has the further advantage that the amount of memory that is necessary for a temporarily storage of multiprotocol encapsulation and forward error correction data in the memory unit is reduced. For example, the amount of memory is determined by the burst size plus an amount of extra memory to store a part of the data of the next burst, until processing of the multiprotocol encapsulation data of the first burst has been finished. As a specific example, the amount of extra memory is determined by the fact that the computing time for the forward error correction is limited. In such a case, the amount of memory for multiprotocol encapsulation and forward error correction data may be greater than the memory requirement for the data of one burst, but less than the memory requirement for the data of two bursts. As a result, the amount of memory is less than the memory requirement to store the whole data of two consecutive bursts.

According to the measure as defined in claim 2 processing of the data of the first burst is performed during the time to the beginning of the second burst and the time that is obtained by storing the data of the second burst in the extra memory. Hence, an increase in the throughput for processing the data of the first burst may reduce the extra memory needed and, hence, further reduce the memory of the memory unit.

Thereby, according to the measure as defined in claim 3, the extra memory of the memory unit is determined by at least the forward error correction processing. Further, the throughput for readout operations may be taken into account, as proposed by the measure as defined in claim 4.

The measure as defined in claim 5 has the advantage that the memory consumption may be optimized. For example, first, the memory units overwrites the forward error correction data of the first burst with the second part of the data of the second burst. Therefore, the multiprotocol encapsulation data of the first burst may be transmitted to an application engine, while the new data of the second burst is stored. Further, according to the measure as defined in claim 6, forward error correction of the multiprotocol encapsulation data of the first burst is processed, while the data of the second burst overwrites that part of the forward error correction data of the first burst that is not necessary for a successful correction. This has the advantage that the memory consumption is further reduced. When the forward error correction is finished, the remaining part of the forward error correction data of the first burst may be overwritten with the data of the next burst, as proposed by the measure as defined in claim 7. Hence, a memory optimization for consecutive burst reception is achieved.

According to the measure as defined in claim 8, after overwriting at least a part of the forward error correction data of the first burst, the remaining data of the second burst may overwrite a part of the multiprotocol encapsulation data of the first burst.

According to the measures as defined in claims 9 and 10 a cyclic buffer model of the memory of the memory unit may be provided. This has the advantage of an easy memory-addressing scheme.

These and other aspects of the invention will be apparent from and elucidated with reference to the embodiment described hereinafter.

The present invention will become readily understood from the following description of a preferred embodiment thereof made with reference to the accompanying drawings, in which like parts are designated by like reference signs and in which:

FIG. 2A illustrates a frame memory of the device for receiving bursts, as shown in FIG. 1, according to the preferred embodiment of the present invention;

FIG. 2B illustrates the memory allocation according to a cyclic memory model, when receiving consecutive bursts.

Figure 1:
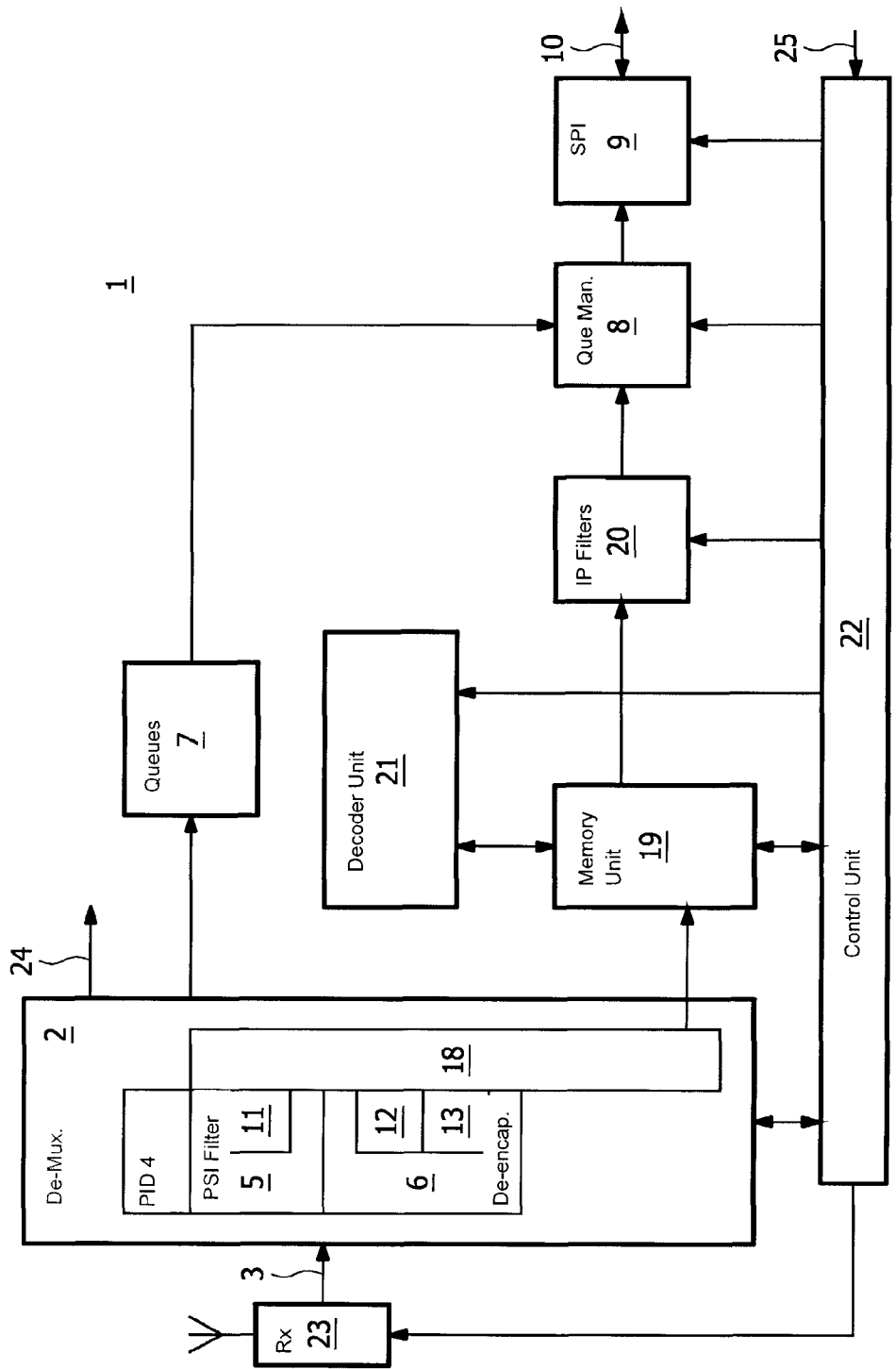
FIG. 1 shows a block diagram of a device for receiving bursts according to a preferred embodiment of the present invention.

FIG. 1 shows a schematic block diagram of a link-layer of a device 1 for receiving bursts in a communications network. The device 1 can be used in a transmission system using digital video broadcasting standards to provide a way of carrying multimedia services over digital terrestrial broadcasting networks. For example, the device 1 may be a part of a handheld terminal, or a mobile phone or another, especially battery powered, apparatus. But, the device 1 and the method of the invention can also be included in or processed by other equipments.

The device 1 according to the preferred embodiment comprises a demultiplexer 2. The demultiplexer 2 is, for example, arranged as a MPEG-2 Transport Stream demultiplexer, wherein the moving picture compression standard MPEG-2 targets studio-quality television and multiple CD-quality audio channels at 4 to 6 Mbps and has also been extended to optimally address high-definition television (HDTV). But, other coding standards, especially for coding of moving pictures and associated audio, may also be provided by the demultiplexer 2. The demultiplexer 2 receives a transport stream over a channel 3. The demultiplexer 2 comprises packet identifier (PID) filters 4, selecting the transport stream packets of an elementary stream. The packet identifier filters 4 are used in combination with service information (SI) and program specific information (PSI) filters 5 and de-encapsulation filters 6 for filtering of service information, program specific information and application information. Selected SI/PSI sections are stored in their corresponding queues 7 and transmitted by a queue manager 8. The selected service information is subjected to several operations before it is transmitted to a serial peripheral interface (SPI) 9 and a channel 10 to an application engine.

Both, sections filtering of the service information and program specific information filters 5 and de-encapsulator filtering by the de-encapsulation filter 6 is accompanied by a cyclic redundancy check (CRC) 11, 12 to detect transmission errors, respectively. The de-encapsulation filtering is also accompanied by a check sum calculation 13.

Routing of multiprotocol encapsulation and forward error correction data to a memory unit 19 is provided by a router 18.

The device 1 comprises internet protocol filters 20 and a decoder unit 21. The decoder unit 21 is adapted to perform a forward error correction on multiprotocol encapsulation data stored in the memory unit 19. After forward error correction processing, the multiprotocol encapsulation data is sent to the queue manager 8 via internet protocol filters 20. A control and power saving unit 22 is connected with the demultiplexer 2, the memory unit 19, the decoder unit 21, the internet protocol filters 20, the queue manager 8 and the SPI 9. Further, the control and power saving unit 22 is connected with a receiving unit 23. The receiving unit 23 receives consecutive bursts via the communications network and outputs the transport stream over the channel 3. Between the bursts received, the receiving unit 23 is switched off by the control and power saving unit 22 for power saving. Further, control and power saving of the demultiplexer 2, the memory unit 19, the decoder unit 21, the internet protocol filters 20, the queue manager 8 and the SPI 9 is provided by the control and power saving unit 22. The control and power saving unit 22 also receives data from an interchip communication channel (12C). The demultiplexer 2 may have one or more outputs, for example an output 24 for a partial or full transport stream for other services, such as terrestrial digital video broadcasting.

The internet protocol filters 20 extract a datagram from the multiprotocol encapsulation data. Thereby, a datagram is a network layer data frame. In the case of internet protocol, a datagram is an internet protocol datagram. In general, a datagram is a network layer packet with full address information enabling it to be routed to the endpoint without further information. The receiving unit 23 receives bursts comprising data. Thereby, each of the bursts may comprise multiprotocol encapsulation data as well as forward error correction data. Thereby, different bursts may be transmitted over different channels. Timing offset information may be provided to indicate the timing between succeeding bursts. In case of digital video broadcasting for handheld terminals, such a timing offset information is known as "delta-t". At least a part of the data received is sent to the memory unit 19 via the demultiplexer 2. In the following, storing and processing of the multiprotocol encapsulation and forward error correction data is described in further detail with reference to FIGS. 2A, 2B und 2C.

FIG. 2A illustrates the memory structure of the memory unit 19. A number k of rows depends on the service and can be 256, 512, 768 or 1024. The number of columns depends on the burst size and the number of bursts to be stored temporarily in the memory unit 19. The memory unit 19 of the device 1 according to the preferred embodiment of the invention comprises 255+n columns. Further, it is supposed that the memory consumption of the multiprotocol encapsulation and forward error correction data included in one burst corresponds to 255 columns, each of which having k rows, and that n is smaller than 255. Hence, the amount of memory of the memory unit 19 suffices to store the data of more than one burst, but less than the data of two bursts. For example, the amount of memory of the memory unit 19 may correspond to the data of 1.1 bursts. But, depending on the application, the amount of memory of the memory unit 19 can also correspond to a number of bursts, which number is greater than 1 and has a non-vanishing fraction part.

When the receiving unit 23 receives a first burst, the multiprotocol encapsulation and forward error correction data of the first burst is sent to the memory unit 19. The memory consumption of the multiprotocol encapsulation data is 255-M columns. It is assumed that storage of the memory encapsulation data of the first burst starts in column 0 of the memory unit 19. Hence, the multiprotocol encapsulation data of the first burst is stored in the memory area 30 comprising columns 0 to 254-M. The forward error correction data of the first burst is then stored in a memory area 31 comprising columns 254-M+1 to 254. Hence, the data of the first burst is stored in columns 0 to 254.

The extra memory of the memory unit 19 results in columns 0 to n−1 that, until now, are unused and represent a buffer or extra memory. But, it should be noted that data of a preceding burst usually allocated the extra memory area 32.

With reference to FIGS. 2A and 2B a cyclic memory management is described in the following. When the receiving unit 23 receives a second burst, a first part of the data of the second burst is stored in the extra memory area 32, i.e. columns 0 to n−1 of the extra memory area 32. The number n of the columns of the extra memory area 32 is selected in correspondence with a throughput for processing the data of the first burst. This processing may start after the first burst had been received. This processing may include a forward error correction processing and transmission of the multiprotocol encapsulation data of the first burst towards the application engine. Due to the restriction on computer time and power consumption, this processing has not been finished until the reception of the second burst. The extra memory area 32 results in a specific gain of time. Hence, the processing is finished before a memory overflow occurs. Then, the decoder unit 21 releases the memory areas 30, 31. As shown in FIG. 2B, a second part of the data of the second burst is then stored in columns n to 254 of a memory area 33. After reception of the second burst, the multiprotocol encapsulation and forward error correction data of the second burst is stored in the memory areas 32, 33. A remaining memory area 34 is now regarded as an extra memory area 34 for storing a part of the following burst. In the meantime, the decoder unit 21 processes the data stored in the memory areas 32, 33.

Figure 2C:
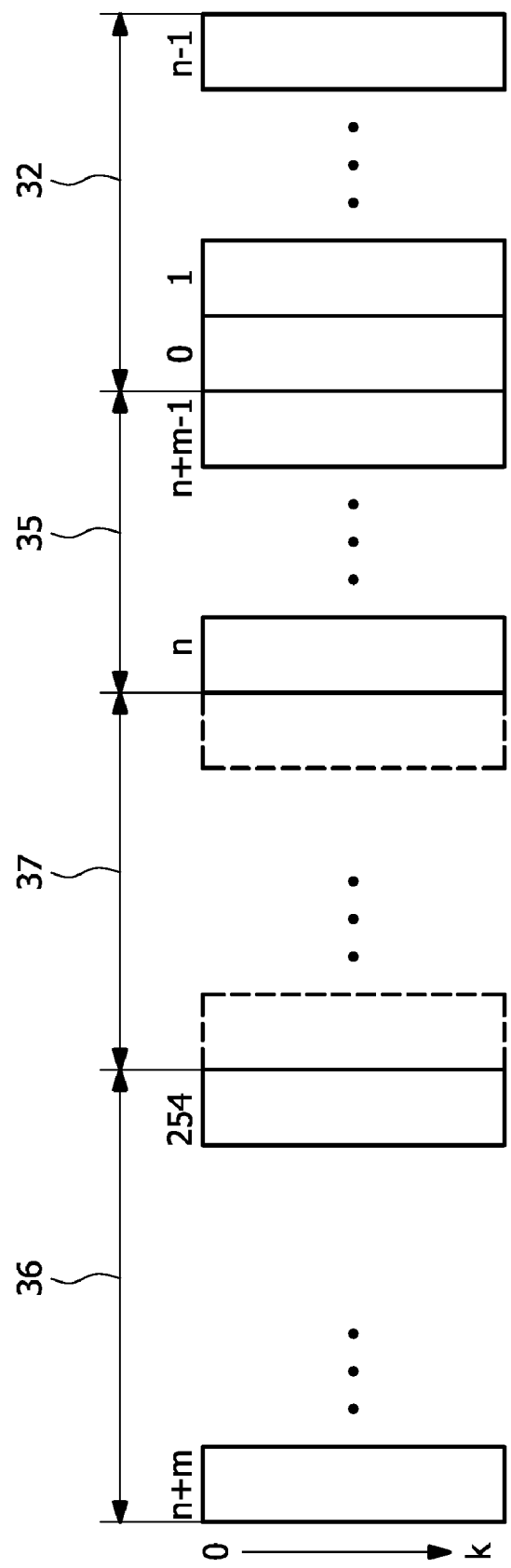
FIG. 2C illustrates the memory allocation according to a non-cyclic memory model, when receiving consecutive bursts.

With reference to FIGS. 2A and 2C, a non-cyclic memory management is described in the following. After reception of the first burst, columns 0 to 254 are allocated for temporarily storage. The extra memory area 32 is provided to store a first part of the second burst in its columns 0 to n−1. In the meantime, the decoder unit 21 performs a forward error correction processing on the multiprotocol encapsulation data stored in columns 0 to 254-M on the basis of at least a part of the forward error correction data stored in columns 254-M+1 to 254.

In a first situation, forward error correction processing is finished until the column n−1 of the memory of the memory unit 19 is allocated. Hence, the whole memory area 31 may be released. Hence, all M columns of the memory area 31 may be allocated by a second part of the data of the second burst. That means that the memory area 35 is allocated, and the second part of the data of the second burst is stored in columns n to n+m−1 of the memory area 35, and the condition that m=M corresponds to the fact that all forward error correction data stored in the memory area 31 is overwritten with the second part of the data of the second burst. This condition means that the memory area 35 equals the memory area 31.

In a second situation, only a part of the memory area 31 is released due to the fact that the forward error correction processing has not been finished or due to some other reason. In this situation, the second part of the data of the second burst is stored in the memory area 35 using columns n to n+m−1. Now, the condition that m is less than M holds, because the memory area 35 is only a part of the memory area 31. Processing and transmission of the multiprotocol encapsulation data of the first burst stored in the memory area 30 is finished, until the column n+m−1 of the memory area 35 is allocated. Hence, a third part of the data of the second burst is stored in a memory area 36. As a result, the first part of the data of the second burst having columns 0 to n−1 is stored in the memory area 32, the second part of the data of the second burst having columns n to n+m−1 is stored in the memory area 35, and the third part of the data of the second burst having columns n+m to 255 is stored in the memory area 36. Further, a memory area 37 is free and is now regarded as an extra memory area 37 or buffer memory area 37. The size of the extra memory area 37 is the same as the size of the extra memory area 32, as shown in FIG. 2A.

It should be noted that a certain or even dynamical choice of m may be used to avoid a large number of non-contiguous memory areas 30 to 37 when storing a large number of bursts.

Further, it should be noted that M is set so that the amount of memory represented by M columns equals the memory requirement for storing the forward error correction data of a burst. The value M may vary, especially when different services are received.

Although an exemplary embodiment of the invention has been disclosed, it will be apparent to those skilled in the art that various changes and modifications can be made which will achieve some of the advantages of the invention without departing from the spirit and scope of the invention. Such modifications to the inventive concept are intended to be covered by the appended claims in which the reference signs shall not be construed as limiting the scope of the invention. Further, in the description and the appended claims the meaning of "comprising" is not to be understood as excluding other elements or steps. Further, "a" or "an" does not exclude a plurality, and a single processor or other unit may fulfill the functions of several means recited in the claims.

The invention claimed is:

1. A device for receiving bursts in a communications network, comprising:
   a receiving unit for receiving said bursts; and
   a memory unit, wherein said receiving unit is adapted to receive a first burst comprising multiprotocol encapsulation and forward error correction data and to send at least a part of said first burst to said memory unit, and is adapted to receive a second burst comprising multiprotocol encapsulation and forward error correction data and to send at least a part of said second burst to said memory unit, and wherein said memory unit is adapted to store said first burst in a first part and said second burst in a second part and to overwrite a part of said first burst to store said second burst after said first data is processed, wherein said memory unit is arranged so that the second part is sized based on a throughput for processing said data of said first burst.

2. The device according to claim 1, further comprising:
   a decoder unit (21) adapted to perform a forward error correction on said multiprotocol encapsulation data of said first burst stored in said memory unit (19), and wherein said throughput for processing said data of said first burst is determined by at least said forward error correction processing of at least a part of said multiprotocol encapsulation data of said first burst.

3. The device according to claim 2, wherein said throughput for processing said data of said first burst is determined also by a rate to output said multiprotocol encapsulation data of said first burst after performing said forward error correction on said multiprotocol encapsulation data of said first burst.

4. The device according to claim 1, wherein said memory unit (19) is adapted to overwrite at least a part of said forward error correction data of said first burst with a second part of said data of said second burst.

5. The device according to claim 4, wherein said memory unit (19) is adapted to overwrite that part of said forward error correction data of said first burst that is not necessary for a successful forward error correction of said multiprotocol encapsulation data of said first burst in view of an amount of error detected in the multiprotocol encapsulation data of said first burst.

6. The device according to claim 4, wherein said memory unit (19) is adapted to overwrite a part of said multiprotocol encapsulation data of said first burst with a third part of said data of said second burst.

7. The device according to claim 1, wherein said memory unit (19) is adapted to overwrite said forward error correction data of said first burst with a second part of said data of said second burst, after a decoder unit (21) has performed a forward error correction processing on said multiprotocol encapsulation data of said first burst.

8. The device according to claim 1, wherein said memory unit (19) is adapted to overwrite at least a part of said multiprotocol encapsulation data of said first burst with a second part of said data of said second burst.

9. The device according to claim 8, wherein said memory unit (19) is adapted to overwrite said multiprotocol encapsulation data of said first burst and a part of said forward error correction data with said second part of said data of said second burst.

10. A method for receiving burst in a communications network, which method comprises the steps of:
    receiving a first burst comprising multiprotocol encapsulation and forward error correction data;

storing at least a part of said multiprotocol encapsulation data of said first burst and at least a part of said forward error correction data of said first burst;

receiving a second burst comprising multiprotocol encapsulation and forward error correction data;

storing a first part of said data of said second burst in a second memory part in addition to the data of said first burst stored in a first memory part, wherein said second memory part is sized according to a processing throughput of said data of said first burst; and overwriting a part of said data of said first burst in said first memory part with a second part of said data of said second burst, after said data of said first burst has been processed.

* * * * *